Jan. 6, 1970 J. CHUPITY ET AL 3,488,453

MAGNETIC TAPE TRANSPORT WITH TAPE STRETCHING SPEED CONTROL MEANS

Filed Nov. 8, 1965 2 Sheets-Sheet 1

JOSEPH CHUPITY,
GUIDO SALCEDO &
JOHN D. SPERRY
INVENTORS

BY Robert G. Clay

ATTORNEY

JOSEPH CHUPITY,
GUIDO SALCEDO &
JOHN D. SPERRY
INVENTORS

BY Robert G. Clay

ATTORNEY

United States Patent Office 3,488,453

Patented Jan. 6, 1970

3,488,453

MAGNETIC TAPE TRANSPORT WITH TAPE STRETCHING SPEED CONTROL MEANS

Joseph Chupity, Mountain View, Guido Salcedo, San Jose, and John D. Sperry, Los Altos, Calif., assignors to Ampex Corporation, Redwood City, Calif., a corporation of California

Filed Nov. 8, 1965, Ser. No. 506,733
Int. Cl. G11b *5/00*
U.S. Cl. 179—100.2 10 Claims

ABSTRACT OF THE DISCLOSURE

A rotating head magnetic tape transport is provided with a common drive means for both the tape driving capstan and the rotating heads. The speed of the drive means may be varied within a preselected range, but once selected, remains constant, so that the heads and capstan are driven in unison and at a constant speed for the duration of the operating mode desired. To ensure correct tracking of the heads, the longitudinal speed of the tape is varied by controlled stretching of the tape between the capstan and the supply reel, as by a braking device on the supply reel. For time-base expansion playback at low speed, a flywheel is coupled to the motor, capstan and head drive system to provide greater constancy of speed; and switching of the heads is accomplished by circuits mounted on the head drum. In addition, the low-speed reproduce signal strength is stepped-up by circuits mounted on the head drum, to improve the low-speed signal-to-noise ratio.

Figure 1:
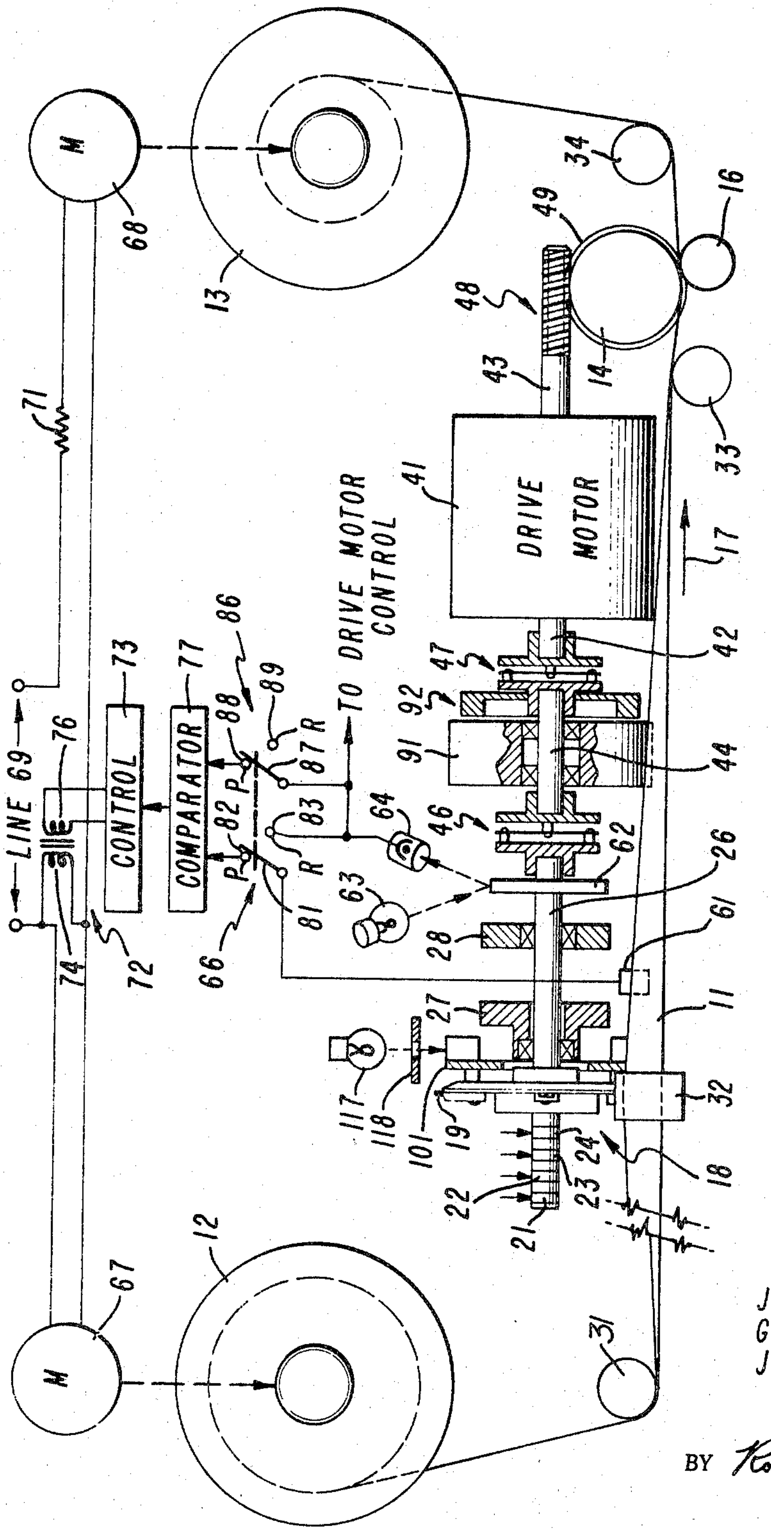

This invention relates to magnetic tape transports, and particularly to such transports employing rotating transducer heads. The invention described herein was made in the performance of work under a NASA contract and is subject to the provisions of the National Aeronautics and Space Act of 1958, Public Law 85–568 (72 Stat. 426; 42 U.S.C. 2451), as amended.

Rotating head tape transports are generally subject to tape drive and tracking problems, in that a tape recorded at a predetermined constant speed may stretch or shrink longitudinally before it is played back, with the result that the playback speed is different, and the transverse recorded tracks do not properly register with the rotating heads during their playback sweeps. A similar problem results if the tape is started in the playback mode with the heads not properly tracking. One solution recognized in the art is to vary the rotational speed of the tape-driving capstan during playback to provide a suitable longitudinal speed for the tape. However, this solution necessitates mechanical and electronic complexities that are desirable to avoid, if possible.

When such a transport is to be used for "time-base expansion," the tape is generally recorded at a very high longitudinal speed and played back at a comparatively low speed. Because the head-to tape speed is very much lower in this playback mode, the reproduced signal strength is similarly low, and the "signal-to-noise" ratio, the ratio of the signal strength and the comparatively unchanged "noise" signal produced by slip rings and other sources, is also undesirably low. Furthermore, the problem of stabilizing the rotational speeds in the system is greater in the low-speed mode of operation.

Accordingly, it is an object of the present invention to provide a rotating head tape transport mechanism embodying simpler means for maintaining correct tracking of the heads on the tape.

It is another object of the invention to provide a mechanism as above described and suitable for use at extremely great recording and playback speed differentials.

A transport in accordance with the invention includes a common drive means for both the tape driving capstan and the rotating heads. The speed of the drive means may be varied within a preselected range, but once selected, remains constant, so that the heads and capstan are driven in unison and at a constant speed for the duration of the operating mode desired. To ensure correct tracking of the heads, the longitudinal speed of the tape is varied by controlled stretching of the tape between the capstan and the supply reel, as by a braking device on the suppy reel. For time-base expansion playback at low speed, a flywheel is coupled to the motor, capstan and head drive system to provide greater constancy of speed; and switching of the heads is accomplished by circuits mounted on the head drum. In addition, the low-speed reproduce signal strength is stepped-up by circuits mounted on the head drum, to improve the low-speed signal-to-noise ratio.

Figure 2:
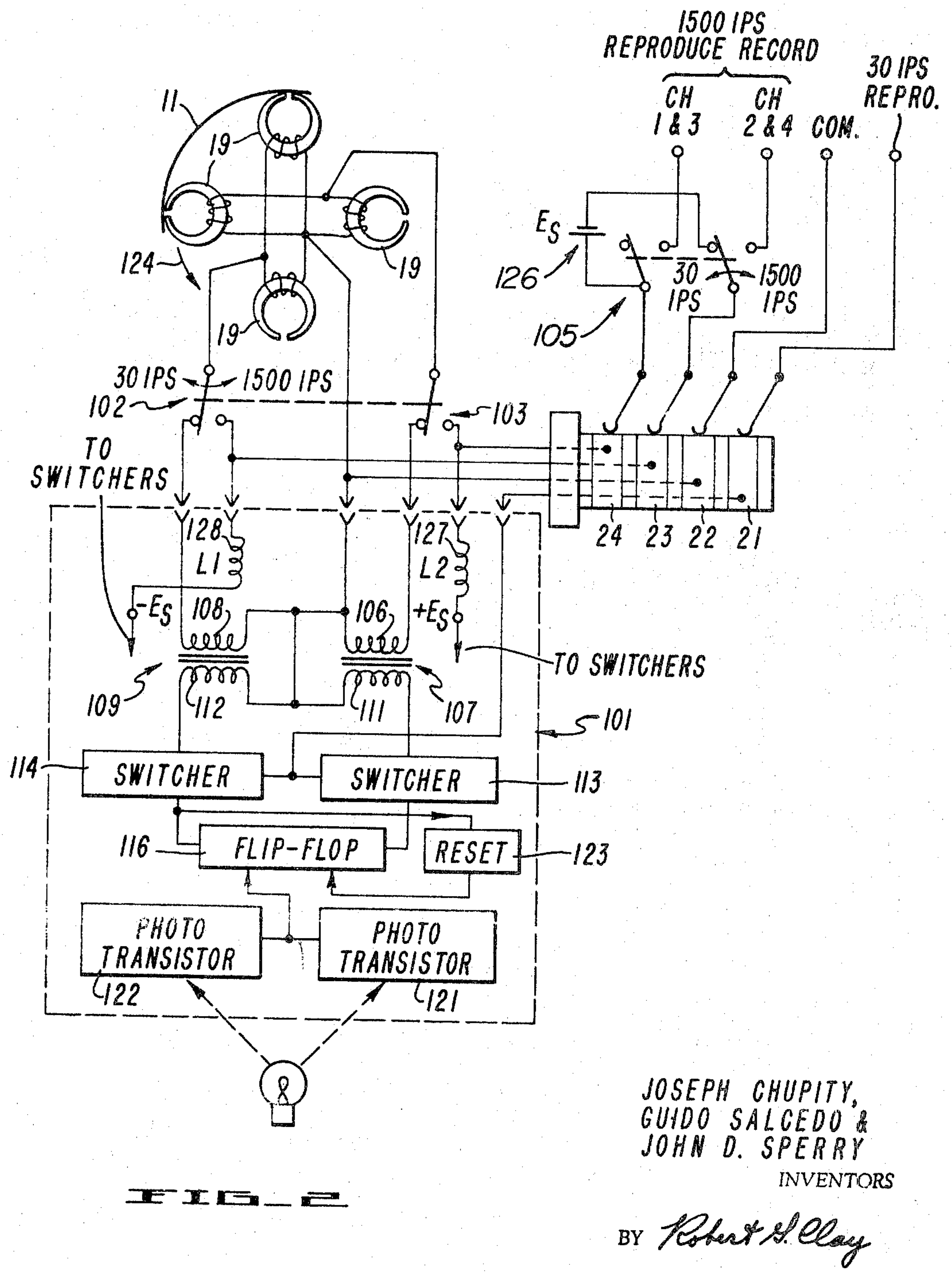

A better understanding of the invention may be had by reference to the following description, taken in conjunction with the accompanying drawings, in which:

FIGURE 1 is a schematic view of a transport in accordance with the invention; and FIGURE 2 is a schematic diagram of various circuits of the transport of FIGURE 1.

Referring now to the drawing and particularly to FIGURE 1 thereof, there is shown a transport for a magnetic tape 11, including a supply reel 12 and a takeup reel 13, and a capstan 14 and pinch roller 16 combination for driving the tape in the direction of arrow 17 past a rotating head drum 18. On the drum 18 are four circumferentially equi-spaced transducing heads 19, which are coupled through circuits later to be shown to various ones of a set of slip rings 21, 22, 23, and 24. The shaft 26 of the head drum 18 is mounted by appropriate bearings in a pair of fixed bearing blocks 27 and 28. The tape is guided from the supply reel 12 over a fixed guide 31 and through a female guide 32, which cradles the tape in a transversely curved concentric relation to the head drum 18, so that the heads 19 successively sweep the width of the tape as the head drum rotates. The width of the tape 11 is such that the span of the tape on the head drum is slightly greater than the circumferential span of adjacent heads 19. From the guide 32, the tape is passed over a fixed guide 33, between the capstan 14 and pinch roller 16, over a fixed guide 34, and to the takeup reel 13.

In order to drive the head drum 18 in synchronous relation to the passage of the tape, a fixed drive motor 41 is provided, the motor having a shaft with a first extension 42 in one direction toward the head drum 18 and a second extension 43 in the opposite direction toward the capstan 14. The first shaft extension 42 is coupled to the shaft 26 of the head drum as by means of an intermediate shaft 44 and a pair of flexible couplings 46 and 47. Thus the head drum 18 may be considered as mounted on the shaft extension 42 for rotation therewith. The second shaft extension 43 is proivded with threads 48 to constitute a worm, and a worm wheel 49 is coupled to the capstan 14 and is engaged by the worm 48 to drive the tape in the direction of arrow 17.

To make sure that the heads 19 correctly track on the tape during the playback mode, regardless of dimensional changes that may have occurred in the tape subsequent to recording, and also to bring the tape into correct tracking relationship with the heads 19 when the tape is first placed on the machine during the playback mode, the present invention utilizes means for controllably varying the holdback force and tension on the tape. As a first step, it is necessary to place on the tape during the record mode some form of indicia that may be used during the playback mode to determine whether or not the heads 19 are in correct tracking relationship, and if not, the magnitude of the tracking error. Accordingly, a control track transducer head 61 is mounted to engage an edge portion of the tape in the proximity of the head drum 18, this transducer 61 having as a first function the recording of a longitudinal control track on the tape during the record mode of operation. To provide the necessary control track signal for recording on the tape, a tachometer means is mounted on and adjacent to the shaft of the motor 41 and head drum 18. As shown in FIGURE 1, the tachometer means comprises a tachometer disc 62 mounted on the head drum shaft 26, and a fixed light source 63 mounted to direct a beam of light at the disc 62 for reflection to a photocell 64, which is in turn coupled to the transducer 61 through a play-record switch 66 during the record mode. The tachometer disc 62 may be formed in any of a number of well-known ways, but as actually used in the invention, is formed generally of a non-reflecting substance with a single small spot of light-reflecting material on the periphery, so that a single control track pulse is emitted by the photocell 64 on each revolution of the disc 62. Thus a pulse is recorded longitudinally on the tape once for each four sweeps of the heads 19 across the tape, and at an instant when a particular one of the heads 19 is at a predetermined point in its transverse sweep. As indicated in FIGURE 1, the signal from the photocell 64 is also taken off for use in regulating the drive motor 41 to a constant speed during both record and playback modes, and for use in switching the heads 19 during high-speed playback mode in a manner well known in the art.

During the playback mode of the apparatus, transducer 61 is used to read the control track previously recorded on the tape and to vary the torque of a holdback motor 67, which is coupled to the supply reel 12 to tension the tape 11. It will be understood that if the heads 19 are not correctly tracking the recorded transverse tracks during the playback mode, the tension of the tape may be increased or decreased so as to physically stretch or relax the tape between the supply reel 12 and capstan 14. Such stretching or relaxing of the tape alters the cross-sectional area of the tape at the capstan, and changes the mass rate of flow of the tape past the capstan. In effect, changing the tape tension changes the longitudinal speed of the tape past the capstan even though the rotational speed of the capstan is held constant. If the tape has been started on the machine during playback mode with the heads 19 not correctly tracking, the speed of the tape can thus be altered to bring the tape into correct tracking relationship; and similarly, if the tape has undergone dimensional changes subsequent to recording, the tape speed may be thus adjusted to achieve and maintain the correct tracking relationship with the heads 19.

To provide the necessary control of the motor 67, this motor is coupled in parallel with a takeup reel motor 68 to a line source of power 69, a resistor 71 being coupled between the motor 68 and the line 69. A control transformer 72 is provided as part of a control circuit 73, with the secondary winding 74 of the transformer coupled in shunt across the leads to the motor 67. Changing the current in the primary winding 76 of the transformer thus alters the voltage across the holdback motor 67, and the takeup motor 68 as well, inversely varying the respective torques exerted by the motors on the reels. The control circuit 73 receives an output error signal from a comparator 77, which in turn receives a pair of input signals coming from the control track head 61 and the tachometer photocell 64 during the playback mold. Specifically, the switch 66 has a leaf 81 coupled to the transducer 61, a play contact 82 coupled to the comparator 77, and a record contact 83 coupled to the photocell 64; and a second play-record switch 86 is provided with a leaf 87 coupled to the photocell 64, a play contact 88 coupled to the comparator 77, and a record contact 89 to which the leaf is moved during the record mode. Thus it will be seen that the actual position and speed of the tape as read by the transducer 61 during the playback mode is compared by the comparator 77 to the actual position and speed of the head drum 18; and the comparator 77 emits a signal representing the magnitude of the error for use by the control circuits 73 in appropriately altering and maintaining the holdback torque of the motor 67.

As will be seen from the drawing, during the record mode the comparator 77 is uncoupled from the control track head 61 and tachometer, and the tension of the tape is maintained at a predetermined value by setting the control circuit 73 at a predetermined setting.

For time base expansion use, it is desirable to operate the transport at a first high-speed record-reproduce mode, e.g., with a head-to-tape speed of 1500 inches per second, and in a second low-speed reproduce mode, e.g., with a head-to-tape speed of 30 inches per second. One problem in such operation is that the rotational speed of the system is more difficult to stabilize at the low speed required. Accordingly, the present invention includes a high inertia flywheel 91 that is mounted on appropriate bearings for free rotation on the intermediate shaft 44 (FIGURE 1) so that at high speed the flywheel is uncoupled from the system. For coupling the flywheel to the system for slow speed operation, a clutch means 92 is provided in direct attachment to the shaft 44 and is arranged to be selectively coupled to the flywheel 91. The operation of the clutch 92 may be by hand, or by centrifugally operable means, or by other automatic means well known in the art.

Another problem in time base expanse operation is that when the tape is played back at the lower speed, the reproduced signal strength is quite low. At the same time, the voltage drop across the slip ring means 21–24 produces a "noise" signal that is of substantially the same strength at both high and low operating speeds. In order to distinguish the low speed signal above the noise, it is necessary to increase the reproduced signal strength before the signal passes through the slip ring means. Accordingly, there is attached to the head drum 18 a "card" circuit 101 (FIGURE 2) that is operable for this purpose. To couple the circuit 101 to the system during low speed operation only, a pair of centrifugally operable switches 102 and 103 are provided on the drum. The heads 19 being arranged as usual in the art, with diametrically opposite pairs of heads coupled in parallel, the switch 102 is used to couple one pair of heads to the receiving circuits and the switch 103 is used to couple the other pair of heads thereto, a common line 104 being taken from one of the heads to ground through slip ring 22. During high speed operation at 1500 IPS, the switch 102 couples the heads associated therewith to channels 2 and 4 of a 1500 IPS record-reproduce circuit through the slip ring 23, while switch 103 couples the heads associated therewith through slip ring 24 to channels 1 and 3 of the 1500 IPS record-reproduce circuit. The coupling to the 1500 IPS circuit is made through a double leaf switch 105 for purposes to be later described. During 1500 IPS reproduce operation, the heads are switched on as they enter the tape, and off as they leave the tape, by means previously known in the art, that form part of the 1500 IPS reproduce circuit.

When operated at 30 IPS, the heads 19 are coupled by the centrifugal switches 102, 103 to step-up transformer means mounted on the head drum and forming part of the card circuit 101. For example, one diametrically opposite pair of heads 19 is coupled to the primary winding 106 of a transformer 107, while the other pair of heads is coupled to the primary winding 108 of a transformer 109. The secondary windings 111 and 112, respectively, of the transformers, are coupled to a pair of switchers 113 and 114, which are coupled in parallel to the 30 IPS reproduce circuits through slip ring 21. The switchers 113, 114 are controlled by a flip-flop 116 so that one switcher is conducting while the other is nonconducting, in alternation. To effect the head-switching operation in proper timed sequence, a stationary light source 117 is mounted adjacent the head drum card 101 (FIGURE 1) and directing a beam of light toward the card through a narrow opening in a fixed mask 118. On the card are mounted a pair of diametrically opposite phototransistors 121 and 122, arranged to be energized by the lamp 117 once each for each revolution of the head drum. The photo-transistors 121, 122 are coupled in parallel to one input of the flip-flop 116, and the corresponding flip-flop output (i.e., the output coupled to switcher 114) is coupled to a delay and reset circuit 123, the output of which is coupled to the other input of the flip-flop 116. The delay of the circuit 123 is set at approximately the time needed for a 90-degree sweep of the heads 19. The operation is as follows. Assuming that one of the heads 19 associated with switcher 113 is just leaving the tape 11 in the direction of arrow 124, the switcher 113 being in conducting state, while one of the heads associated with switcher 114 has just entered the tape, with switcher 114 non-conducting, one of the photo-transistors (e.g. 121) is operated so that the flip-flop 116 causes switcher 114 to go on and switcher 113 to go off. The same operation activates the reset 123, which ninety degrees later, operates the flip-flop again to turn switcher 113 on and switcher 114 off. Ninety degrees still later, the other photo-transistor 122 again operates the flip-flop to turn switcher 114 on and switcher 113 off, and so on. Thus the heads 19 are always switched during the "overlap" time when two adjacent heads are both on the tape. Small errors in the setting of the time delay in reset circuit 123 are tolerable, since there is an appreciable period of "overlap" time when two heads are both engaging the tape; and the error is not cumulative because, in effect, a correction is made each 180 degrees of revolution, when the photo-transistors operate the flip-flop.

It will be noted also that power for operating the switchers 113, 114 is supplied during slow-speed playback operation by a battery 126, through switch 105 and slip rings 23, 24, the couplings to the switchers passing through choke inductance coils 127, and 128, respectively, to protect the head 19 circuits from switching transients originating in the switchers 113, 114.

With the above-described circuits, it will be seen that the low-level signals from the heads 19 are stepped-up by the transformers 107, 109 before reaching the slip rings, and the signal-to-noise ratio is increased to acceptable levels during slow-speed playback, while head switching in this mode is accomplished on the rotating head drum also.

Thus there has been described a transport in accordance with the invention including a common drive means for both the tape driving capstan and the rotating heads. The speed of the drive means may be varied within a preselected range, but once selected, remains constant, so that the heads and capstan are driven in unison and at a constant speed for the duration of the operating mode desired. To ensure correct tracking of the heads, the longitudinal speed of the tape is varied by controlled stretching of the tape between the capstan and the supply reel, as by a braking device on the supply reel. For time-base expansion playback at low speed, a flywheel is coupled to the motor, capstan and head drive system to provide greater constancy of speed; and switching of the heads is accomplished by circuits mounted on the head drum. In addition, the low-speed reproduce signal strength is stepped-up by circuits mounted on the head drum, to improve the low-speed signal-to-noise ratio.

What is claimed is:

1. In a magnetic tape recording and reproducing machine, including a rotating head upstream from a capstan in the direction of the tape travel, a capstan drive and tracking system, comprising:

common drive means coupled to both said capstan and said rotating head for driving same in unison;

tape holdback tensioning and stretching means upstream from said rotating head in the direction of the tape travel for varying the speed of said tape past said rotating head independently of said drive means; and means for sensing the tracking error of said tape at said rotating head and for controlling said holdback tensioning and stretching means to minimize said error.

2. A capstan drive and tracking system as described in claim 1 and further characterized in that said drive means includes:

an electric motor having a first shaft extension in one direction and a second shaft extension in the opposite direction;

a drum mounted on said first shaft extension for rotation therewith;

a plurality of said heads mounted in circumferentially equi-spaced relation on said drum;

said second shaft extension being threaded to constitute a worm;

a worm wheel coupled to said capstan and engaged by said worm, the rotation of said capstan being such as to drive said tape in said opposite direction past said head drum; and means for guiding said tape past said drum and in curved concentric relation thereto for engagment by said rotating heads.

3. A capstan drive and tracking system as described in claim 1 and further characterized in that said tape holdback and stretching means includes:

a supply reel on which said tape is stored; and brake means for said supply reel, said brake means being controlled by said sensing means.

4. A capstan drive and tracking system as described in claim 3 and further characterized in that:

said brake means includes a variable-torque holdback motor coupled to said supply reel for exerting holdback tension on said tape; and said sensing means includes tachometer means mounted on and adjacent to said motor shaft and emitting a signal representing the rotational speed and angular position of said head drum, a control track on said tape and transducer means for reading said control track and emitting a signal representing the longitudinal speed and position of said tape, comparator means coupled to said tachometer means and said transducer means for receiving and comparing said speed and position signals and emitting a signal representing the speed and position error of said tape relative to said head drum, and control means coupled to said comparator means and said holdback motor for controlling the torque thereof to minimize said error.

5. A capstan drive and tracking system as described in claim 4 and further characterized in that:

said transport also includes a takeup reel and a variable torque takeup motor coupled thereto for winding up said tape coming from said capstan, said holdback and takeup motors being coupled in parallel to a line source of power, and a resistor coupled between said takeup motor and said power source; and said control means includes a control transformer the secondary winding of which is coupled in shunt with said holdback motor, the current in the primary winding of said control transformer being varied by said control means in accordance with said error signal, to correspondingly vary the torque of said holdback motor.

6. A capstan drive and tracking system as described in claim 5 and further characterized in that:

a first play-record switch is provided, including a switch leaf coupled to said control track transducer means and operable between a play contact and a record contact, said play contact being coupled to said comparator means, and said record contact being coupled to said tachometer means; and a second play-record switch is provided including a switch leaf coupled to said tachometer means and operable between a play contact and a record contact, said play contact being coupled to said comparator means.

7. A capstan drive and tracking system as described in claim 2 and further characterized in that:

a flywheel is mounted for free rotation on one of said shaft extensions; and a clutch is mounted on said one shaft extension adjacent said flywheel for selectively coupling said flywheel to said one shaft extension.

8. A capstan drive and tracking system as described in claim 2 and further characterized in that:

slip-ring means is provided on said first shaft extension;

a first stationary signal source and receiving means is coupled to said slip-ring means for recording and reproducing said signal at high speed;

a second stationary signal receiving means is coupled to said slip-ring means for reproducing said signal at low speed; and centrifugal switching means having high speed and low speed positions is mounted on said head drum for coupling said heads to said signal means selectively according to the rotational speed of said head drum.

9. A capstan drive and tracking system as described in claim 8 and further characterized in that:

step-up transformer means having an input and an output is mounted on said head drum for increasing the strength of said signal in the low speed reproduce mode;

the input of said transformer means being coupled to said heads and said centrifugal switching means for energization only in the low speed position of said centrifugal switching means; and the output of said transformer means being coupled to said second stationary signal receiving means through said slip-ring means.

10. A capstan drive and tracking system as described in claim 9 and further characterized in that:

said heads consist of four heads, of which each diametrically opposite pair are coupled in parallel, the span of said tape on said head drum being greater than the span of adjacent pairs of said heads;

said centrifugal switching means includes a pair of switches coupled respectively to said diametrically opposite pairs of heads;

said transformer means includes a pair of transformers each having an input and an output, the transformer inputs being coupled respectively to said centrifugal switches for receiving said signal from said respective diametrically opposite pairs of heads only in the low speed position of said centrifugal switching means;

a stationary light source is provided adjacent said head drum;

photo-sensitive switching means is mounted on said head drum for cyclical operation by said light source between first and second positions four times on each revolution of said head drum, with said operation taking place only at times when adjacent pairs of said heads are engaging said tape; and the outputs of said transformers being coupled to said slip-ring means through said photo-sensitive switching means for alternating connection to said second stationary signal receiving means on each operation of said photo-sensitive switching means.

References Cited

UNITED STATES PATENTS

| | | | |
|---|---|---|---|
| 3,213,204 | 10/1965 | Okamura | 179—100.2 |
| 3,378,646 | 4/1968 | Shashoua et al. | 179—100.2 |
| 2,897,290 | 7/1959 | Lyon | 179—100.2 |

BERNARD KONICK, Primary Examiner

R. S. TUPPER, Assistant Examiner